No. 894,026. PATENTED JULY 21, 1908.
L. MAMBOURG & U. HOUZE.
GLASS PRODUCING SYSTEM.
APPLICATION FILED FEB. 3, 1908.
2 SHEETS—SHEET 2.
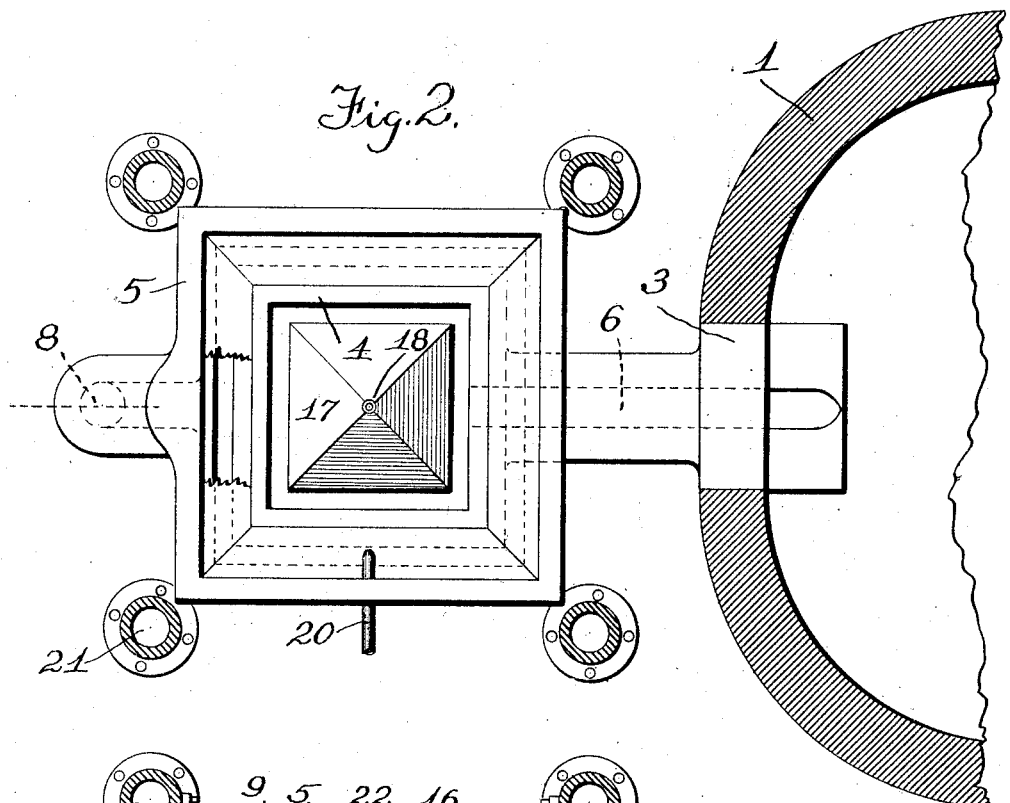
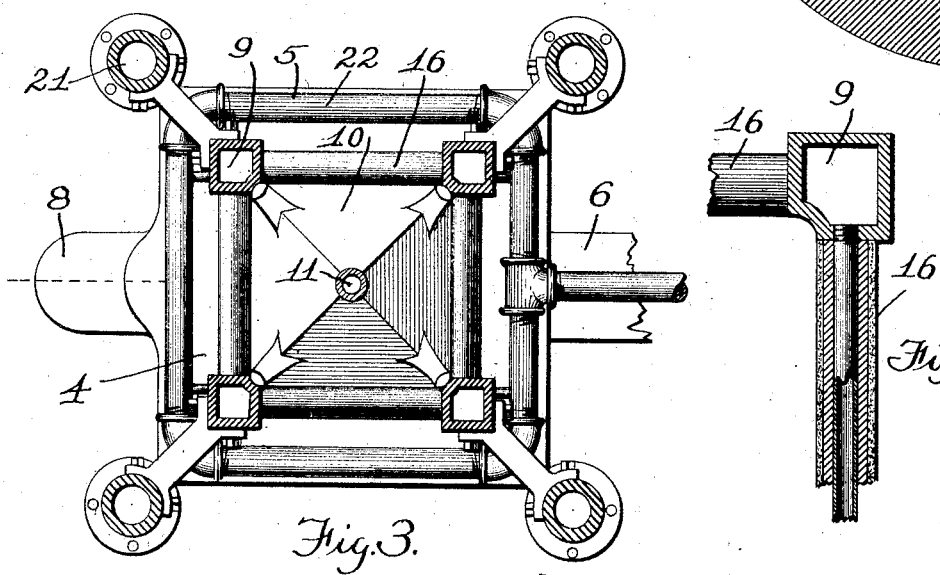
Witnesses:
Elmer R. Shipley.
M. S. Belden.
Leopold Mambourg
Ulgisse Houze    Inventors
by James W. See
Attorney

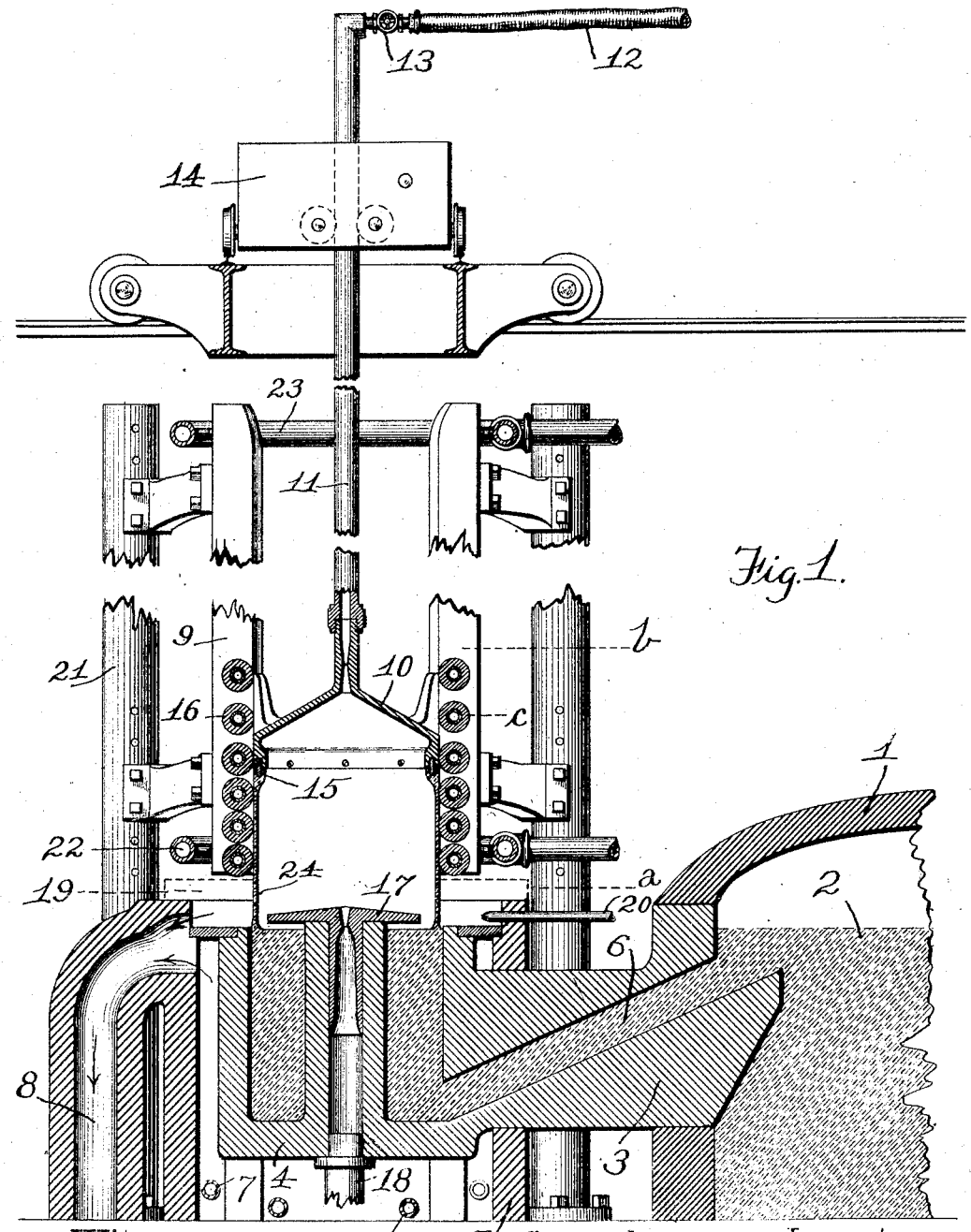

UNITED STATES PATENT OFFICE.

LEOPOLD MAMBOURG AND ULGISSE HOUZE, OF MOUNT VERNON, OHIO, ASSIGNORS TO THE MAMBOURG GLASS SHEET MACHINE COMPANY, OF MOUNT VERNON, OHIO.

GLASS-PRODUCING SYSTEM.

No. 894,026.    Specification of Letters Patent.    Patented July 21, 1908.

Application filed February 3, 1908. Serial No. 413,944.

*To all whom it may concern:*

Be it known that we, LEOPOLD MAMBOURG and ULGISSE HOUZE, citizens of the United States, residing at Mount Vernon, Knox county, Ohio, have invented certain new and useful Improvements in Glass - Producing Systems, of which the following is a specification.

This invention, having in view mainly the production of sheet glass of a superior quality and at materially reduced cost, will be readily understood from the following description taken in connection with the accompanying drawings in which:—

Figure 1 is a vertical section of an apparatus exemplifying our improved system: Fig. 2 a horizontal section of the same in the plane of line *a* of Fig. 1: Fig. 3 a horizontal section in the plane of line *b* of Fig. 1: and Fig. 4 a horizontal section in the plane of line *c* of Fig. 1.

In the drawings:—1, represents an ordinary melting tank: 2, the molten glass therein: 3, a nose-block of the tank: 4, the pot which is illustrated as rectangular in plan: 5, a furnace surrounding the pot for the purpose of maintaining the temperature of the molten glass therein: 6, a conduit leading from the tank to the pot and serving to maintain the glass in the pot at the level of that in the tank, this conduit declining from a point somewhat below the level of the glass in the tank to a point at or near the base of the pot, whereby the pot is constantly supplied with glass withdrawn from the upper portion of the mass in the tank and avoiding the inferior glass found in the lower portions of the mass in the tank: 7, gas burners in the furnace 5, typifying means for heating that furnace: 8, chimney connection from the furnace 5: 9, a series of hollow vertical guide columns disposed over the pot, their inner guiding corners being preferably concave and disposed in the vertical planes of the inner corners of the pot: 10, a cross-head arranged to slide vertically upon the columns and be guided thereby: 11, a suspender connected with the crosshead and being, preferably, in the form of a tube: 12, a flexible pipe connected with this suspender and adapted for connection with a source of supply of compressed air to be delivered to a point below the crosshead: 13, a valve for controlling the flow of air through the suspender: 14, a hoisting apparatus connected with the suspender and serving as means by which the crosshead may be raised and lowered, this hoisting apparatus having preferably the form of the trolley of a traveling crane: 15, bait-lip carried by the base of the crosshead very near its margin: 16, a series of rollers extending across from column to column, with the inner portions of their peripheries not far outwardly away from the vertical planes of the sides of the bait-lip, these rollers being preferably of carbon and mounted to turn on tubes connected with the guide columns so that the rollers may be water cooled: 17, a core disposed within the pot over the upper surface of the molten glass therein, the margins of this core being preferably but a short distance inwardly from the vertical planes of the inner portions of the rollers, the illustration showing this core as of mushroom shape and supported by a hollow stump extending up from the floor of the pot: 18, a compressed air conduit leading up through the stump and core and to be connected with a suitable source of supply of compressed air: 19, an imperforate cover which may be temporarily disposed over and form a roof for the pot furnace: 20, a gas burner typifying means for getting extra heat to the surface of the glass in the pot: 21, frame-columns for the support of the guide-columns: 22, a ring pipe at the base of the guide columns and connected with the interior thereof and adapted to be connected with a source of supply of cooling water: 23, a similar ring pipe at the top of the columns for the discharge of the cooling water: and 24, the hollow glass structure being produced, its top being connected with the bait-lip and its base being formed at the upper surface of the molten glass in the pot.

The glass is melted in the tank and new material supplied thereto as withdrawals take place, in the usual manner. The pot is continuously supplied from the tank and, quite regardless of the method or means employed for drawing the glass from the pot, the supply in the pot is maintained at a constant level and, owing to the lack of intermittency in supplying the pot the glass withdrawn from the pot will be of uniform quality. This continuous supply method to the pot is also conducive to enhance economy in time and labor.

In using the apparatus provided for drawing and blowing the glass, the crosshead is lowered to near the top of the glass in the pot and when the bait-lip has been properly heated it is lowered a trifle into the glass which immediately adheres thereto. The crosshead is now slowly drawn upwardly, the effect thus far being to produce a rectangular shell of glass in plastic condition, the lower edge of this shell being always at the constant level of the glass maintained in the pot. Under certain conditions of the glass and at comparatively high speeds of drawing, the base of the forming shell of glass tends to neck inwardly and reduce the horizontal dimension of the base of the shell. The core 17 serves in preventing such necking action to any material degree. The mushroom shape for the core 17 is advantageous in that it permits the pot to always hold a greater body of glass than would be the case if the core extended full size clear to the floor of the pot.

Compressed air is blown into the interior of the forming shell of glass, either through the blow pipe formed by the suspender 11 or through the blow pipe formed by the conduit 18, the advantage of the latter being that it becomes possible to avoid complicating the drawing mechanism with the blowing mechanism.

The outward pressure of the air within the forming shell of glass tends, of course, to put the shell into the form of a cylinder providing the glass is soft enough and the tendency is not resisted. But in the present case the shell is confined to the rectangular plan by reason of its contact with the rollers. These rollers are arranged at the base of the guide columns and low enough down, or close enough to the surface of the glass in the pot, to fully define the rectangular form of the shell before the glass forming the shell shall have become so cool as to resist changes in form, and there are to be enough of the rollers engaging the shell to hold the shell to the rectangular form until the glass shall have become cool enough to hold its rectangular form without extraneous support and in spite of the internal air pressure. The sides of the forming shell of glass are therefore given the flat form and guided by the roller-formed walls inclosing the shell, while the extreme corners of the shell may be guided by the inner corners of the guide columns.

While the lowermost rollers are to be low enough down to accomplish the purpose above indicated for them, they should be kept as high up as their purpose will permit in order to keep them as far as practicable from the heat of the pot. The guide columns and the rollers are water cooled.

It is to be noted that the drawing and formation of the shell can begin instantly upon the dipping of the bait-lip into the glass, no time being lost in the preliminary formation of a neck. During the drawing of the shell the air pressure will be regulated with such regard to the speed of drawing and to the thickness of the shell that the shell will be maintained in its rectangular form without being bulged outwardly between the rollers. When the shell has been drawn to the desired length then a sudden hoist will sever its base from the glass in the pot and the shell may then be withdrawn from the apparatus and conveyed away for subsequent treatment. From the sides of the shell flat sheets of full size may be cut, ready at once for the annealing furnace, thus avoiding entirely the great costs and wastes and lowering of quality incident to the production of sheet glass by first blowing a cylinder and then treating the cylinder in a flattening furnace.

When the shell is entirely hoisted away from the glass in the pot there may be portions of the soft glass not pulled away but falling to the pot in not fully melted condition. In such case the burners 20 may be brought into action temporarily to apply special heat at the top of the glass in the pot and, if desired, the cover 19 may be temporarily placed over the pot-furnace to protect the mechanism from the heat which may be especially high at this time. This renders it unnecessary to hoist the column and roller structure up for protection.

In the construction illustrated provision is made for drawing the shell rectangular in cross-section, but it is manifest that the shell may have any desired number of flat sides in lieu of the four provided for in the exemplification. Some features of the system are of applicability in associations other than those set forth and are of availability for products other than sheet glass and many of the details of the system will lend themselves to quite a range of variations at the hands of a skilled constructor. The particular construction set forth is to be viewed as an exemplification only. We have explained the principle of our invention and have set forth the best form in which we at present contemplate embodying that principle.

We claim:—

1. Glass producing apparatus comprising, a vessel adapted to contain molten glass to be withdrawn therefrom upwardly in the form of a shell, a head movably supported above the vessel, means for raising and lowering said head to and from the glass in the vessel, a bait carried at the base of said head and adapted to dip into the molten glass in the vessel, a series of horizontal members supported over said vessel near the molten glass therein and adapted to make contact with the exterior of the shell as it is formed, and a conduit adapted to convey compressed air into the space between said head and the molten glass in the vessel while the shell is being formed by the movement of the head upwardly away from the glass in the vessel, combined substantially as set forth.

2. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and having a flat-sided horizontal contour and horizontal dimensions corresponding substantially with the horizontal cross-section of the shell to be produced, said bait-lip being adapted to dip into the molten glass in the vessel, a series of horizontal members supported over said vessel near the molten glass therein, said members having straight inner surfaces parallel with the flat sides of the bait-lip and adapted to make contact with the exterior of the shell as it is formed, and a conduit adapted to convey compressed air into the space between said head and the molten glass in the vessel while the shell is being formed by the movement of the head upwardly away from the glass in the vessel, combined substantially as set forth.

3. Glass producing apparatus comprising, a vessel adapted to contain molten glass to be withdrawn therefrom upwardly in the form of a shell, a head movably supported above the vessel, means for raising and lowering said head to and from the glass in the vessel, a bait carried at the base of said head and adapted to dip into the molten glass in the vessel, a series of horizontal rollers supported over said vessel near the molten glass therein and adapted to make contact with the exterior of the shell as it is formed, and a conduit adapted to convey compressed air into the space between said head and the molten glass in the vessel while the shell is being formed by the movement of the head upwardly away from the glass in the vessel, combined substantially as set forth.

4. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and having a flat-sided horizontal contour and horizontal dimensions corresponding substantially with the horizontal cross-section of the shell to be produced, said bait-lip being adapted to dip into the molten glass in the vessel, a series of horizontal rollers supported over said vessel near the molten glass therein and adapted to make contact with the exterior of the shell as it is formed, and a conduit adapted to convey compressed air into the space between said head and the molten glass in the vessel while the shell is being formed by the movement of the head upwardly away from the glass in the vessel, combined substantially as set forth.

5. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and adapted to dip into the molten glass in the vessel, a series of horizontal rollers supported over said vessel near the molten glass therein and adapted to make contact with the exterior of the shell as it is being formed, a vertical series of horizontal rollers supported above and in the vertical plane of each of the first-mentioned rollers, and a conduit adapted to convey compressed air into the space between said head and the molten glass in the vessel while the shell is being formed by the movement of the head upwardly away from the glass in the vessel, combined substantially as set forth.

6. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and having a flat-sided horizontal contour and horizontal dimensions corresponding substantially with the horizontal cross-section of the shell to be produced, said bait-lip being adapted to dip into the molten glass in the vessel, a series of horizontal rollers supported over said vessel near the molten glass therein and adapted to make contact with the exterior of the shell as it is being formed, a vertical series of horizontal rollers supported above and in the vertical plane of each of the first-mentioned rollers, and a conduit adapted to convey compressed air into the space between said head and the molten glass in the vessel while the shell is being formed by the movement of the head upwardly away from the glass in the vessel, combined substantially as set forth.

7. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and adapted to dip into the molten glass in the vessel, horizontal hollow rollers supported over said vessel and adapted to make contact with the exterior of the shell as it is being formed, means for circulating water through the interior of said rollers, and a conduit adapted to convey compressed air into the space between said head and the molten glass in the vessel while the shell is being formed by the movement of the head upwardly away from the glass in the vessel, combined substantially as set forth.

8. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and adapted to dip into the molten glass in the vessel, vertical guide columns adapted to be engaged by said head and disposed at the vertical planes of the corners of the shell to be produced, horizontal rollers supported by said guide columns and adapted to make contact with the exterior of the shell as it is being formed, and a conduit adapted to convey compressed air into the space between said head and the molten glass in the vessel while the shell is being formed by the movement of the head upwardly away from the glass in the vessel, combined substantially as set forth.

9. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and having a flat-sided horizontal contour and horizontal dimensions corresponding substantially with the horizontal cross-section of the shell to be produced, said bait-lip being adapted to dip into the molten glass in the vessel, vertical guide columns adapted to be engaged by said head and disposed at the vertical planes of the corners of the shell to be produced, horizontal rollers supported by said guide columns and adapted to make contact with the exterior of the shell as it is being formed, and a conduit adapted to convey compressed air into the space between said head and the molten glass in the vessel while the shell is being formed by the movement of the head upwardly away from the glass in the vessel, combined substantially as set forth.

10. Glass producing apparatus comprising, a vessel adapted to contain molten glass to be withdrawn therefrom upwardly in the form of a shell, a head movably supported above the vessel, means for raising and lowering said head to and from the glass in the vessel, a bait-lip carried at the base of said head and adapted to dip into the molten glass in the vessel, vertical hollow guide columns disposed over the vessel in the vertical planes of the corners of the shell to be produced, hollow horizontal rollers supported by the bases of said guide columns and adapted to make contact with the exterior of the shell as it is being formed, conduits for effecting a circulation of water through said guide columns and rollers, and a conduit adapted to convey compressed air into the space between said head and the molten glass in the vessel while the shell is being formed by the movement of the head upwardly away from the glass in the vessel, combined substantially as set forth.

11. The improvement in the art of glass-working, which consists in preparing a mass of molten glass, drawing a shell upwardly therefrom, maintaining a pressure of air within the shell tending to expand it in circular form while soft, and maintaining a mechanical pressure upon the exterior of the shell to resist the internal air pressure and to force the shell to assume a flat-sided form.

12. The improvement in the art of glass-working, which consists in preparing a mass of molten glass, drawing a shell upwardly therefrom, maintaining a pressure of air within the shell tenidng to expand it in circular form while soft, maintaining a mechanical pressure upon the exterior of the shell to resist the internal air pressure and to force the shell to assume a flat-sided form, and maintaining such exterior mechanical pressure upon the rising shell until the shell shall have become sufficiently cold to maintain its flat-sided form notwithstanding the internal air pressure tending to give it the circular form.

LEOPOLD MAMBOURG.
ULGISSE HOUZE.

Witnesses:
J. B. WAIGHT,
FRANK MOORE.